UNITED STATES PATENT OFFICE 2,128,392

FLAMEPROOFING COMPOSITION

Charles M. Albion, Boston, Mass., assignor to Herbert B. Morse, Wellesley, Mass.

No Drawing. Application May 12, 1937, Serial No. 142,314

6 Claims. (Cl. 106—31)

The present invention relates to compositions for the prevention of flame-propagation in inflammable materials such as the insulation of electrical conductors, nonmetallic conduits for such conductors, prepared roof coverings, and for other like and analogous goods and purposes. It comprises the combination (in the legal sense of that term) with a foundation coating or impregnating substance, such as asphalt, coal tar, or a wax (natural or synthetic), of a substance capable of generating an inert or fire quenching gas when heated, and a non-combustible substance which is fusible by the heat of a flame briefly applied and solidifies on cooling into a hard continuous body.

A part of my object is to produce a composition which can be made at small expense and sold to the use of industry at low cost; and one which at the same time is substantially non-absorptive of water and not subject to oxidation. While flameproofing substances, compounds and mixtures are known, some of which are highly efficient considered from the point of view of flameproofing alone, yet those which are most efficient in this particular are high in cost, and some are unsatisfactory also by reason of propensity to absorb water and to combine with oxygen when heated to the melting point.

As the gas generating ingredient of my composition I use preferably a chlorinated hydrocarbon or chlorinated lime. These substances contain large proportional contents of chlorine gas which is liberated under heat application. For instance, chlorinated lime, produced by passing chlorine gas through slaked or (preferably) unslaked lime may contain in absorbed condition as much as from 35% to 45% of chlorine. Many hydrocarbons, both solid and liquid, may be chlorinated to like effect. As an example of a solid chlorinated hydrocarbon which is suitable for my purpose and which I have used to good effect, I may mention hexachlorethane. But many other hydrocarbons capable of absorbing or combining with chlorine and of giving off chlorine gas when heated, are known to chemists, which may be used for this purpose in my composition.

Suitable fusible substances are borax and solid silicate of soda. These substances melt under the heat of a flame and solidify into a condition resembling glass. Their function in the composition is to form an incrustation, imprisoning the gas which is evolved from the chorinated lime or hydrocarbon.

As an illustrative example of a composition suitable for coating insulated conductors I give the following:

| | Parts |
|---|---|
| Asphalt | 100 |
| Chlorinated lime | 15 |
| Borax | 7 to 10 |

The asphalt here referred to is that which is commonly used for impregnating the braided or woven coverings of insulated wires, nonmetallic electrical conduits, roofing felts and paper, etc.

In place of chlorinated lime, hexachlorethane or other chlorinated hydrocarbon may be substituted; and in place of borax silicate of soda may be substituted. Chlorinated lime and borax, or their equivalents, may also be used in the same or other proportions with coal tar or with various waxes in place of asphalt. Or if desired, borax and silicate of soda may be used together. The content of borax and/or silicate of soda is provided in the solid pulverized form. The chorinated lime, when used, is likewise finely divided; and so is any solid chlorinated hydrocarbon which may be used in place of chlorinated lime. These ingredients, or any two of them, are added to the base composition of asphalt, wax or coal tar when the latter is in liquid condition, or rendered so by heat, and thoroughly mixed by any suitable means.

A wide variation in the base ingredient (i. e., asphalt, tar or waxes) and in the proportions of the other ingredients may be used according as it is desired to control the melting point of the composition and to furnish compositions which penetrate more or less readily among the fibers of braided, woven or felted fabrics. If the composition is to be used as a nonpenetrating coating outside of an impregnated web or felt, a solid hydrocarbon or chlorinated lime is used as the source of the quenching gas. Or a larger proportion of the chlorinated lime and borax, or their equivalents, may be used if it is desired to raise the melting point of the composition. Different asphalts have different melting points, and the melting point of the composition as a whole can be varied considerably by adding relatively larger or smaller contents of the other ingredients. Where it is desired to saturate woven or braided coverings, conduit, roofing felt or paper, etc., coal tar may be substituted for asphalt, or a wax or mixture of waxes having a desired melting point may be used; and a liquid chlorinated hydrocarbon may be substituted for the solid chlorine absorber. I propose to make use of the available knowledge concerning waxes, natural and synthetic, their melting points, and the melting points of various mixtures of such waxes, to produce a composition containing this invention, and in which a wax or wax mixture is used in place of asphalt, having any prescribed or desired melting temperature.

It will be apparent from the foregoing that the specific ingredients and proportions named in the illustrative example are not narrowly limiting as to the scope of the protection which I seek.

The preparations conforming to this invention are applied to insulated wires, conduits, roofing sheets, etc., in the same manner that waterproofing and fireproofing impregnants and coatings have been used heretofore, or in any other way which may be found suitable for the purpose.

When an insulated wire coated with the composition hereinbefore described is subjected to the flame test prescribed by the fire underwriters, the coating liquefies and bubbles. The bubbles are caused by gas evolved from the chlorinated lime, and are imprisoned by the shell or incrustation formed by the borax or silicate of soda. So that on removal from the flame, the coating is found to be a mass of cells or bubbles of which the walls are fixed and made solid by the content of borax or silicate of soda and the interiors are filled with chlorine. Chlorine gas has an active quenching effect on flame and prevents propagation of fire along the inflammable insulation from a point of origin. Thus it prevents spreading of fire in electrical insulation caused by a short circuit. And it has a like effect in preventing the spread of flame from sparks on roofing material. Being much heavier than air, such of it as may escape from the confining walls of the bubbles forms a blanket over subjacent surfaces (such as roof surfaces), extinguishing or helping to extinguish sparks and fire brands at other points.

In its broader aspects the invention is not limited to substances which liberate chlorine on being heated, but includes within the scope of equivalents other materials which in like conditions will liberate other heavy inert gases. But from the commercial aspect, the carriers of liberatable chlorine are preferable to those of other gases on account of their availability and low cost, and of these chlorinated lime, being particularly plentiful and cheap in price, as well as otherwise satisfactory, is preferable to others.

What I claim and desire to secure by Letters Patent is:

1. A composition of matter as and for the purposes hereinbefore described, consisting of a water-repellent material selected from the group consisting of asphalt, coal tar and wax, an inert substance carrying chlorine adapted to liberate chlorine when heated, and a heat fusible substance selected from the group consisting of borax and silicate of soda.

2. A composition of matter as and for the purposes hereinbefore described, consisting of a water-repellent material selected from the group consisting of asphalt, coal tar and wax, chlorinated lime, and a heat fusible substance selected from the group consisting of borax and silicate of soda.

3. A composition of matter as and for the purposes hereinbefore described, consisting of a water-repellent material selected from the group consisting of asphalt, coal tar and wax, a chlorinated hydrocarbon and a substance selected from the group consisting of borax and silicate of soda.

4. A composition of matter as and for the purposes hereinbefore described, consisting of a water-repellent material selected from the group consisting of asphalt, coal tar and wax, chlorinated lime, and borax.

5. A composition of matter as and for the purposes hereinbefore described, consisting of a water-repellent material selected from the group consisting of asphalt, coal tar and wax, chlorinated lime, and silicate of soda.

6. A composition of matter for the purposes set forth, consisting of asphalt, chlorinated lime and borax.

CHARLES M. ALBION.